July 17, 1956

E. G. BEMAN 2,754,805

AIR BRAKE SAFETY DEVICE

Filed Oct. 24, 1950

Inventor:
Estey G. Beman by Hill, Sherman, Meroni, Gross & Simpson
Attys

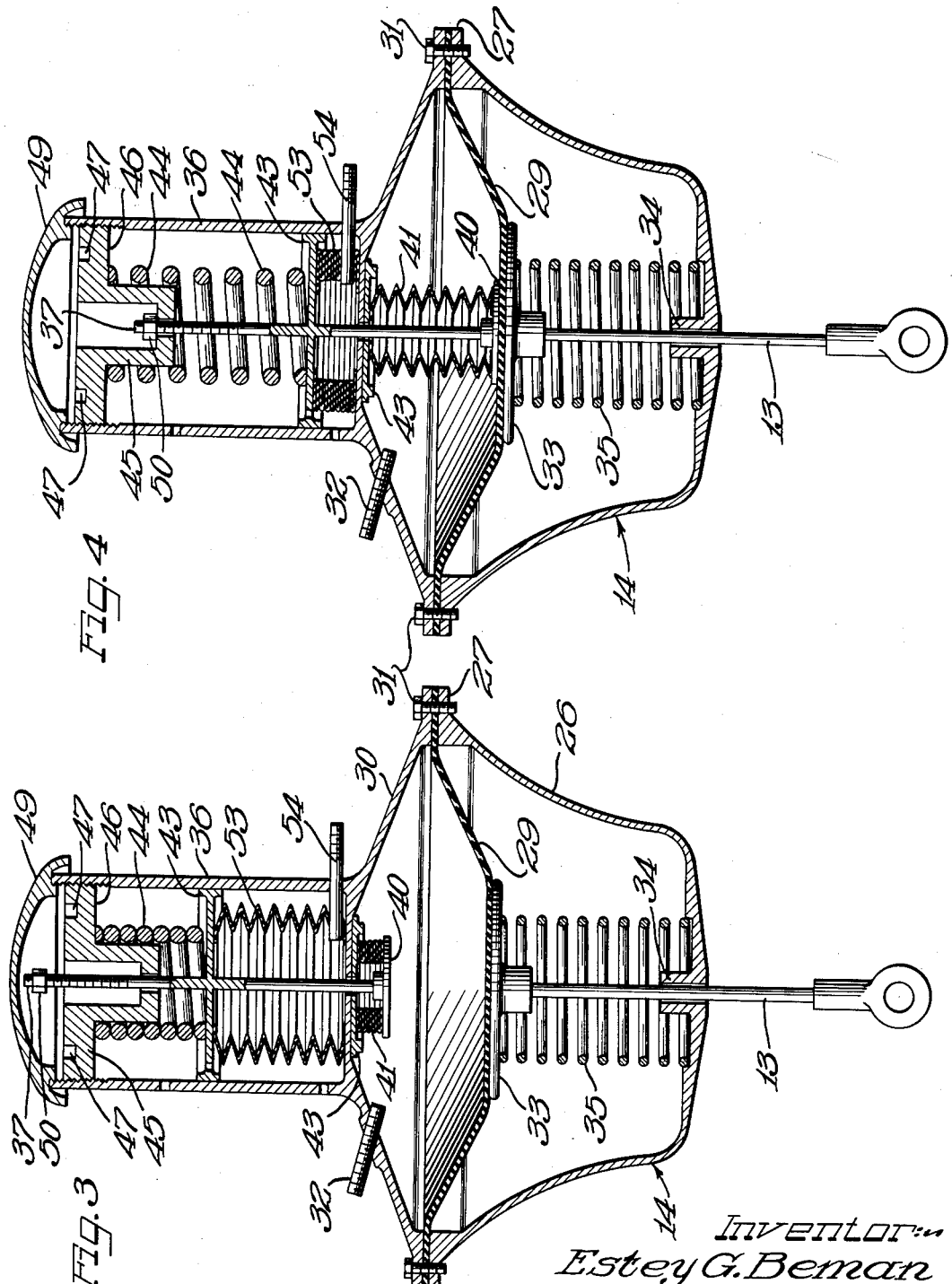

United States Patent Office 2,754,805
Patented July 17, 1956

2,754,805

AIR BRAKE SAFETY DEVICE

Estey G. Beman, Ottumwa, Iowa

Application October 24, 1950, Serial No. 191,904

2 Claims. (Cl. 121—38)

This invention relates to improvements in safety devices for air brakes and more particularly in pressure actuated air brakes of the type adapted for use on motor vehicles or the like.

A principal object of my invention is to provide a safety device for air brakes operable to apply the brakes when air pressure in the braking system drops below a predetermined value.

Another object of my invention is to provide a novel and improved form of safety device for air brakes of a simplified construction, held from operation by air pressure in the braking system and operable to apply the brakes mechanically upon the release of pressure and the dropping of the pressure in the system below a predetermined value.

A still further object of my invention is to provide a simplified form of a safety device for air brakes, utilizing a substantially constant value spring for applying the brakes when the pressure drops below a predetermined face value and utilizing pressure in the braking system to preload or balance the spring and to release the spring to apply the brakes upon a predetermined pressure drop in the braking system.

A still further object of my invention is to provide a safety device for air brakes or the like utilizing a separate diaphragm chamber to control the operation of each brake and having a spring of a constant value in operative association with each diaphragm chamber and also having fluid pressure means connected with the supply tank for the system to balance the spring during normal operation of the braking system, and to release the spring to apply the brakes upon a drop in pressure in the system below a predetermined safe value.

A still further and more detailed object of my invention is to provide a simplified form of safety device for air brakes wherein the brakes are normally applied by pressure in a diaphragm chamber and wherein a spring-operated plunger is operable to apply the brakes through the spring upon the dropping of pressure in the system below a predetermined value and having a pressure member normally balancing the spring and deriving pressure from a supply tank for the braking system, but releasing the spring to apply the brakes when the pressure in the supply tank drops below a value sufficient to apply the brakes.

These and other objects of my invention will appear from time to time as the following specification proceeds and with reference to the accompanying drawings wherein:

Figure 3 is a view somewhat similar to Figure 2, but showing the diaphragm in a fully extended position to apply its associated brake; and Figure 4 is a view somewhat similar to Figure 3, but showing the diaphragm extended by the safety device constructed in accordance with my invention to apply the associated brake mechanically.

As shown on the drawings:

Figure 1:
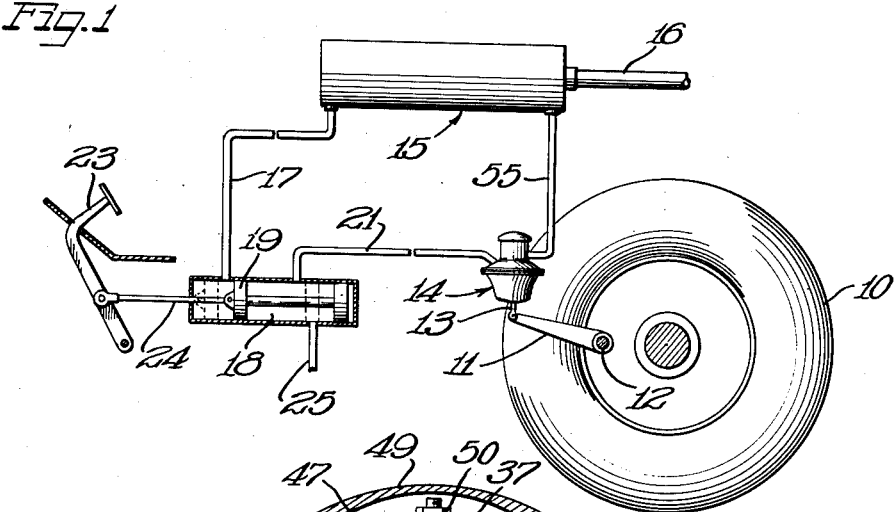
Figure 1 is a diagrammatic view of a braking system illustrating one form in which my invention may be embodied.

In the embodiment of my invention illustrated in the drawings, I have shown generally a wheel 10 of an automotive vehicle, with a lever 11 associated therewith and secured to a transverse shaft 12, to operate an associated brake cam (not shown) to apply or release the associated brake in a manner well known to those skilled in the art. A link 13 extensible from a diaphragm chamber 14 is pivotally connected to the free end of the lever 11, for operating said lever, it being understood that a separate diaphragm chamber and link and lever is provided for each wheel.

An air supply tank 15 is shown in Figure 1 as being provided to supply air under pressure to the air braking system, and may be in the form of an accumulator supplied with air under pressure through a pipe 16 connected with a suitable compressor (not shown). A pipe 17 connects the supply tank 15 with a chamber 18 of a valve 19, herein diagrammatically shown as being a piston type of valve. Another pipe 21 connects the chamber 18 with the pressure side of the diaphragm chamber 14, to supply air under pressure thereto upon operation of the valve by the application of pressure on a brake pedal 23, operatively connected with the valve 19 through a link 24.

The valve 19 may be of a well known form commonly used on air brake systems for motor vehicles and connected to control the supply and release of pressure to all of the diaphragm chambers of the braking system, and is herein shown in a diagrammatic form for the purpose of illustrating my invention. Upon the application of pressure on the brake pedal 23 the valve 19 will be moved to the dotted line position shown in Figure 1, to admit air from the supply tank 15 into the pressure side of the diaphragm chambers 14, to supply pressure to said chambers to apply the brakes. Upon the release of the pressure from said foot pedal, said pedal and valve may be returned by a spring (not shown) to the position shown in Figure 1, to relieve pressure from the pressure sides of the diaphragm chambers 14, through a relief pipe 25, herein shown as leading from the valve chamber 18 to the atmosphere.

Referring now in particular to the diaphragm chamber 14 and the means for applying the brakes upon the dropping of pressure in the supply tank 15 below a predetermined value, the diaphragm chamber 14 is of a well known form commonly used in motor vehicle air brake systems which apply the brakes by the application of pressure on a diaphragm. The pressure or diaphragm chamber 14 includes a lower casing portion 26, herein shown as being of a cup like form, having a flanged rim 27 abutted by a diaphragm 29 secured thereto by a cap 30, herein shown as engaging the top of said diaphragm and held in engagement therewith by machine screws 31, 31 extending through said cap and the diaphragm and threaded in the flange 27. The cap 30 closes the top of the diaphragm 29 and the space between said cap and diaphragm form a pressure chamber supplied with air under pressure by means of a coupling 32, threaded therein and connected with the air pipe 21.

Figure 2:
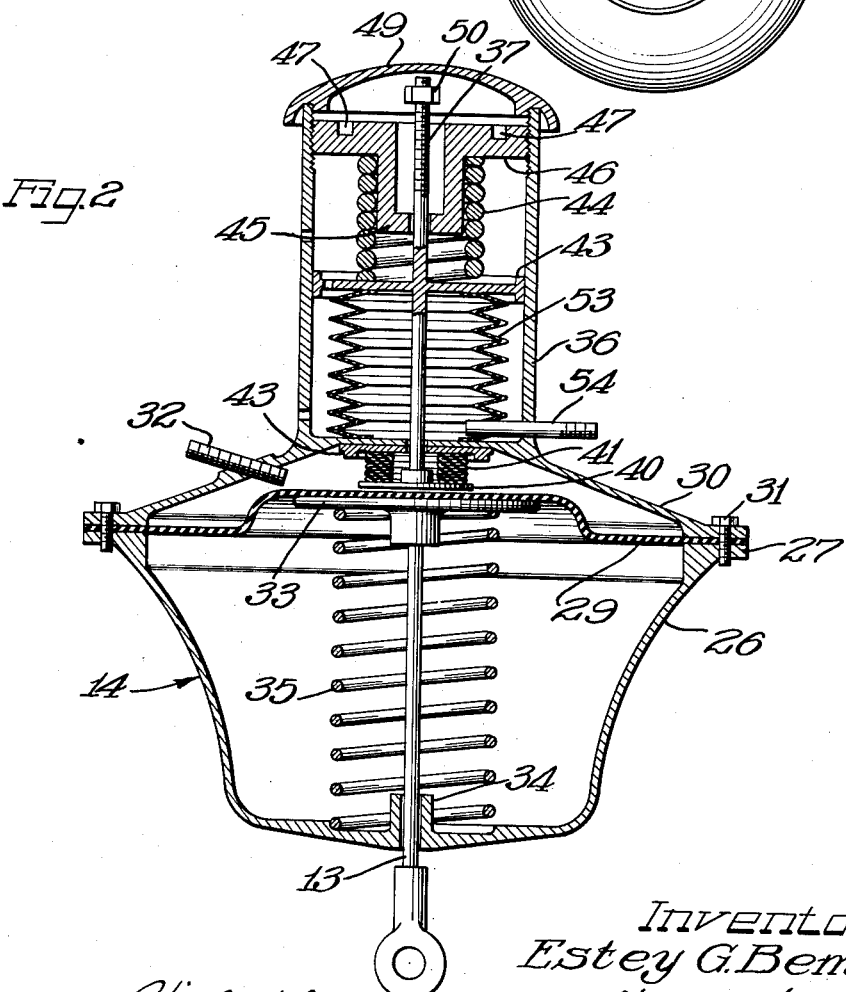
Figure 2 is a transverse sectional view taken through one of the diaphragm chambers for operating a brake linkage, and having a safety device constructed in accordance with my invention embodied therein showing the brake link and diaphragm in an extreme released position.

A diaphragm plate 33 abuts and is secured to the underside of the diaphragm 29 and has the link 13 secured thereto and depending therefrom. The link 13 is slidably guided in an apertured boss 34, extending upwardly within the central portion of the casing 26. A compression spring 35 encircles the link 13 within the casing 26 and is interposed between the bottom of the diaphragm plate 33 and the inside of the bottom of the chamber 26, to urge the link 13 into the brake release position shown in Figures 1 and 2.

The safety device of my invention is herein shown as being mounted in a housing 36 extending upwardly from the top of the cap 30 and sealed from the pressure side of the diaphragm. Said housing may be cylindrical and its inside forms a control chamber controlling the application of the brakes mechanically. A plunger 37 slidably guided within said housing extends through the bottom of said housing into the pressure chamber formed between the top of the diaphragm 29 and the under portion of the cap 30. A pressure foot 40 which may be in the form of a disc, is herein shown as being secured to the bottom of the plunger 37 for engagement with the pressure side of the diaphragm 29. The pressure side of the diaphragm 29 is shown as being sealed from the inside of the housing 36 by means of an extensible accordion or bellows-type seal 41, herein shown as being interposed between the upper surface of the foot 40 and the undersurface of an annular seating member 43 and as being secured to said foot and seating member. The seating member 43 is secured to the underside of the top of the cap 30.

The plunger 37 has an outwardly projecting piston-like guide 43 extending therefrom intermediate its ends and having slidable engagement with the inner wall of the housing 36. A compression spring 44, which may be a substantially constant value spring, is seated on the top surface of the piston-like guide 43 at its lower end and extends upwardly around a depending cylindrical projection 45 of an adjusting member 46 and is seated therein. The adjusting member 46 is threaded within the housing 36 and serves to adjust the spring 44, and to relieve the brakes, when necessary. The adjusting member 46 has a plurality of recessed portions in its upper surface, as indicated by reference numeral 47, for engagement with a wrench to effect adjustable movement of said adjusting member. A cap 49 is threaded to the top of the housing 36 and forms a cover therefor, to prevent dust from getting into said housing. A nut 50 is threaded on the upper end of the plunger 37 and forms an emergency nut, which may be engaged with the adjusting member 46 and turned with respect to the plunger 37, to positively compress the spring 44 and release the brakes, especially in cases where the mechanism might freeze the brakes so that the motor vehicle could not be moved. A pressure-operated accordion bladder or bellows 53 is provided to preload and balance the spring 44 and to release said spring to apply the brakes when pressure in the supply tank 15 drops below a predetermined value. As herein shown, the bellows 53 is secured at its upper end to the underside of the piston-like guide 43 in air tight relation with respect thereto and its lower end to the bottom wall of the chamber 36. A fitting 54 extends within the chamber 36 and within the bellows 53 and has sealing engagement with said bellows to supply air under pressure thereto, to extend said bellows and balance the spring 44. The fitting 54 is connected to the supply tank 15 by a pipe 55.

The pressure of air in the tank 15 and in the braking system thus compresses and balances the spring 44, and holds the plunger 37 from moving in a direction to apply the brakes under normal pressure conditions. Upon release of the pressure in said supply tank as when the brakes are applied, the pressure within the bellows 53 balancing the spring 44 will drop in accordance with the pressure drop in said tank and allow the spring to extend the plunger 37 to follow the diaphragm 29. Upon a further reduction in pressure caused by a leak in the system, the spring 44 may compress the bellows 53 to the position shown in Figure 4 and fully apply the brakes.

During operation of the motor vehicle, when the brakes are normally applied and the pressure in the supply tank 15 is maintained at a sufficiently high value to fully extend the bellows 53, the admission of air under pressure to the pressure side of the diaphragm 29 by operation of the brake pedal 23 and valve 18, will extend the diaphragm 29 and link 13 and apply the brakes by the pressure of air in the system. During this braking operation there will be a reduction of air pressure in the bellows 53 corresponding to the loss of the air caused by braking. During the normal braking operation, however, the loss of pressure will not be sufficient to allow the spring 44 to apply the brakes, and the plunger 37 will merely follow the diaphragm 29 in accordance with loss of pressure in the system. If, however, the brakes are continually applied and released, or fanned, as when going down a long hill and the loss of pressure may be greater than can be supplied by the compressor of the braking system, the pressure within the bladder or bellows 54 will then drop an amount corresponding to the pressure drop within the supply tank 15 and allow the spring 44 to extend the plunger 37 to engage the diaphragm 29 and mechanically extend said diaphragm to apply the brakes, it being understood that as pressure is again built up within the tank 16 that the bellows 53 will retract said plunger with respect to the diaphragm. When, however, the pressure in the tank 15 is low enough to allow the spring 44 to completely collapse the bellows 53, the brakes may be fully applied by the spring 44 and plunger 37, as has hereinbefore been described.

The brakes may thus be applied by air under normal braking conditions and may also be applied mechanically by the action of the spring 44, when the pressure in the supply tank 15 is reduced below a safe value. This gives in effect two braking systems, one dependent upon air pressure and the other dependent upon spring pressure balanced by the bellows 53 and coming into effect to apply the brakes when the air pressure is insufficient to apply the brakes.

It is obvious that if desired a pressure-operated valve or the like (not shown) may be incorporated in the fluid pressure connection from the tank 16 to the bladder 53, which may be held open by tank pressure and will rapidly exhaust the bladder to atmosphere upon the reduction in tank pressure below a predetermined value. Such a valve is no part of my present invention and is only herein referred to in order to make it clear to those skilled in the art that the bladder may rapidly be exhausted if desired, to immediately apply the brakes where conditions warrant this operation of the safety device.

It may be seen from the foregoing that I have provided a novel and improved form of control means and safety device for air brakes dependent upon the pressure in the braking system, which comes into effect to apply the brakes mechanically, immediately upon the dropping of the pressure below a predetermined safe value, thus providing both a mechanical and fluid-operated means for applying the brakes which requires very little more room and mechanism than the ordinary well known form of air brake systems heretofore used in automotive vehicles.

It will be understood that modifications may be effected without departing from the scope of the novel concepts of the present invention.

I claim as my invention:

1. In an air brake system, operating mechanism therefor, a diaphragm chamber including a lower chamber portion having a cap secured to the upper end thereof and a diaphragm secured between said lower chamber portion and cap in leakproof relation with respect thereto, the space within said cap forming a pressure chamber, a link slidably guided in said lower chamber portion and having a diaphragm plate at its inner end abutting said diaphragm, spring means biasing said plate into engagement with said diaphragm and biasing said diaphragm and link in a retracted position, means admitting fluid under pressure to said pressure chamber, said cap having a disk-like top portion having an integral housing extending outwardly therefrom, a plunger slidably guided within said housing and extending through said disk-like top portion within said chamber portion, said plunger having an enlarged diameter guide extending outwardly therefrom within said housing having slidable engagement with the wall of said housing, a fluid pressure loaded bellows encircling said plunger and interposed between said disk-like top portion and said guide and biasing said plunger in a retracted position with respect to said housing, a constant value compression spring engaging the opposite side of said guide from said bellows, for extending said plunger within said pressure chamber upon a predetermined drop in pressure within said bellows, an engaging foot on the end of said plunger within said pressure chamber engageable with said diaphragm to extend said diaphragm and link upon a predetermined reduction in pressure within said bellows, and a flexible sealing member connected between said plunger and disk-like top portion and sealing said pressure chamber from said bellows.

2. In an air brake system, operating mechanism therefor comprising a diaphragm chamber including a lower chamber portion and a cap secured thereto, a diaphragm secured within said lower chamber portion and cap in leakproof relation with respect thereto, the space between said diaphragm and the inner wall of said cap forming a pressure chamber, an inlet for fluid under pressure into said chamber, a link slidably guided in said lower chamber portion and having a diaphragm plate on its inner end engageable with said diaphragm, spring means encircling said link within said lower chamber portion and biasing said diaphragm plate into engagement with said diaphragm, and also biasing said diaphragm and link in retracted relation with respect to said diaphragm chamber, the improvements comprising pressure controlled mechanical means engageable with said diaphragm to operate said diaphragm and link upon failure of pressure within said pressure chamber and including a housing extending outwardly from said cap, a plunger slidably guided within said housing and extending therefrom within said pressure chamber and having an engaging foot within said pressure chamber engageable with said diaphragm to operate the same against the bias of said spring, a bellows seal encircling said plunger within said chamber and connected between said foot and the under portion of the top wall of said cap and sealing said pressure chamber from said housing, said plunger having a disk-like guide member within said housing having slidable engagement with the wall thereof, means venting said housing to atmosphere on either side of said guide member, a constant value spring seated within said housing and engaging one side of said guide member for biasing said plunger into engagement with said diaphragm to operate the same, and a pressure loaded bellows engaging the opposite side of said guide member and balancing said spring by the pressure available to extend said diaphragm to operate said link, and releasing said constant value spring upon a reduction in available operating pressure below a predetermined safe value.

References Cited in the file of this patent
UNITED STATES PATENTS

| | | |
|---|---|---|
| Re. 23,081 | Rockwell | Jan. 25, 1949 |
| 1,209,673 | Coggin et al. | Dec. 26, 1916 |
| 1,488,742 | Duty | Apr. 1, 1924 |
| 1,959,889 | Wunsch | May 22, 1934 |
| 2,057,707 | Carroll | Oct. 20, 1936 |
| 2,090,575 | DeMotte | Aug. 17, 1937 |
| 2,218,719 | Richards | Oct. 22, 1940 |
| 2,346,015 | Eaton | Apr. 4, 1944 |
| 2,364,352 | Dodson | Dec. 5, 1944 |
| 2,409,908 | Simpkins | Oct. 22, 1946 |